United States Patent [19]

Kersten

[11] Patent Number: 4,487,692
[45] Date of Patent: Dec. 11, 1984

[54] SIDEWALL MOUNTED SEPARATOR FOR REMOVING SOLIDS IN WASTE WATER

[75] Inventor: William W. Kersten, Crystal Lake, Ill.

[73] Assignee: Lakeside Equipment Corporation, Bartlett, Ill.

[21] Appl. No.: 527,015

[22] Filed: Aug. 29, 1983

[51] Int. Cl.³ ............................................. B01D 21/00
[52] U.S. Cl. .................................. 210/194; 210/219; 210/521; 210/532.1; 210/926
[58] Field of Search ............... 210/170, 521, 522, 525, 210/532.1, 923, 926, 194, 219

[56] References Cited

U.S. PATENT DOCUMENTS

| | | | |
|---|---|---|---|
| 3,221,889 | 12/1965 | Hirsch | 210/532.1 |
| 3,482,694 | 12/1969 | Rice et al. | 210/522 X |
| 3,788,981 | 1/1974 | Richard et al. | 210/519 X |
| 3,886,064 | 5/1975 | Kosonen | 210/522 X |
| 3,925,205 | 12/1975 | Sparham | 210/522 X |
| 3,975,276 | 8/1976 | Schmid | 210/525 X |
| 4,226,717 | 10/1980 | Malm | 210/926 |
| 4,303,516 | 12/1981 | Stensel et al. | 210/525 X |
| 4,324,655 | 4/1982 | Muskat | 210/926 X |
| 4,351,733 | 9/1982 | Salzer et al. | 210/521 X |
| 4,383,922 | 5/1983 | Beard | 210/521 |

FOREIGN PATENT DOCUMENTS 796438  6/1958  United Kingdom ............... 210/926

Primary Examiner—Richard V. Fisher
Assistant Examiner—W. Gary Jones
Attorney, Agent, or Firm—Wood, Dalton, Phillips, Mason & Rowe

[57] ABSTRACT

A waste water treatment system including an oxidation vessel which receives waste water and has at least one wall and is adapted to introduce oxygen into the waste water contained therein. A clarifier is mounted on the wall at the outlet from the vessel and is narrow in comparison to the vessel. The clarifier includes generally vertical end walls and an imperforate elongated generally vertical sidewall defining upper and lower ends of the clarifier. The lower end of the clarifier is opened to provide for admission of waste water into the clarifier and an apertured plate extends along the length of the clarifier at the upper end and is hydraulically interposed between the clarifier and the vessel outlet.

11 Claims, 5 Drawing Figures

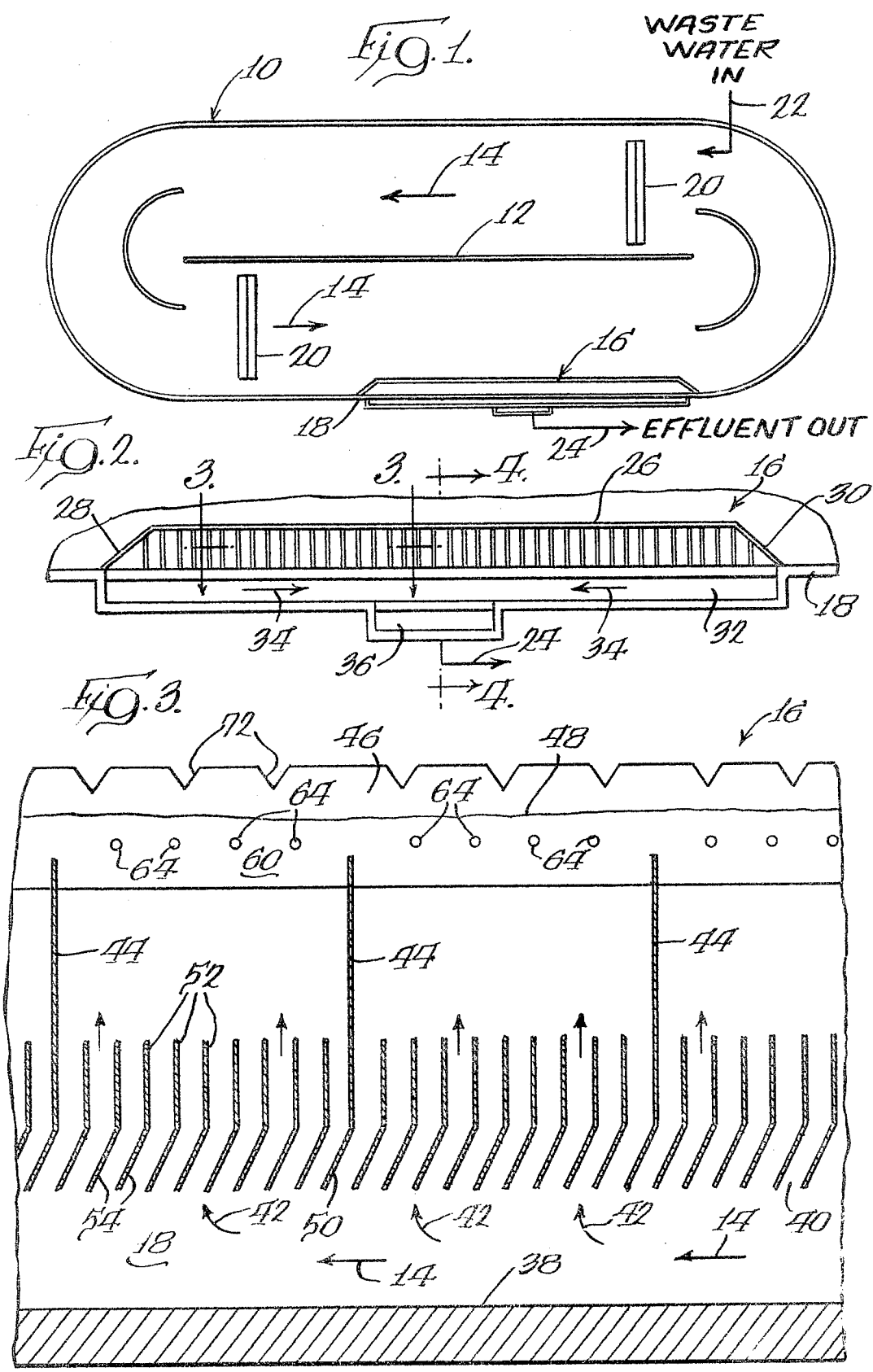

SIDEWALL MOUNTED SEPARATOR FOR REMOVING SOLIDS IN WASTE WATER

FIELD OF THE INVENTION

This invention relates to a separator for removing solids from waste water, and more particularly, to such a separator which is adapted to be mounted in an oxidation vessel employed in waste water treatment.

BACKGROUND ART

In conventional waste water treatment systems, there is typically provided, amongst other components, a clarifier or a separator for removing solids from the waste water, and an aeration vessel wherein components of the waste water are oxidized. Because the typical installation employs separators and aeration vessels which are separate from each other, they are relatively costly from the capital standpoint in that excavation costs, the cost of forming the vessels, usually out of concrete, erection costs including painting, plumbing and electrical installations are increased over what would be required if but a single vessel were to be made. Operational expenses are likewise increased in that some means must be provided for returning solids from the bottom of the separator back to the aeration tank which may be costly to operate.

To eliminate these problems, in recent years there have been proposals of oxidation vessels provided with internal separator or clarifier devices. One such construction is illustrated in U.S. Pat. No. 4,303,516 issued Dec. 1, 1981 to Stensel et al. Other proposals wherein clarifiers are included in an aeration basin include the so-called BMTS intrachannel clarifier. It is also believed that a similar design is offered by Aero-Mod, Inc. of Manhattan, Kans.

While such proposals have eliminated or reduced the above enumerated cost factors associated with systems employing separate clarifiers or separators and aeration vessels, they are not without drawbacks of their own. For example, certain of such constructions act as a restriction in the channel of the aeration vessel which effectively acts as a transverse baffle. This in turn blocks movement of scum or floating material requiring the presence of some means for removing the scum and floating material.

The restrictive nature of such systems frequently interferes with the velocity of the waste water moving in the channel such that velocity gradients may occur. Where a low velocity area is generated, undesirable sludge deposition is likely to occur.

Where steps are made to eliminate the velocity problem, the depth of the channel in the vicinity of the clarifier may be made much greater. This in turn increases the construction costs and has the potential problems that may be posed by the existence of significant ground water or, in the alternative, may require expensive excavation in underlying bedrock.

In others, the design of the clarifier may be such as to allow so-called "short circuiting" meaning that the waste water does not flow uniformly through the entire volume of the separator but takes a path of lesser size. This of course means that the velocity of the waste water in the reduced path is increased over the designed velocity which in turn may interfere with the settling of solids in the waste water.

Other prior art of possible relevance includes the following U.S. Pat. Nos.: 3,788,981 issued Jan. 29, 1974 to Richard et al; 3,925,205 issued Dec. 9, 1975 to Sparham; 3,886,064 issued May 27, 1975 to Kosonen; 3,975,276 issued Aug. 17, 1976 to Schmid; and 4,351,733 issued Sept. 28, 1982 to Salzer.

The present invention is intended to overcome the foregoing difficulties.

SUMMARY OF THE INVENTION

It is the principal object of the invention to provide a vessel wherein both aeration or oxidation and separation or clarification may occur. More specifically, it is an object of the invention to provide such a vessel which eliminates the difficulties heretofore associated with scum and floating material and interference with normal flow velocity.

An exemplary embodiment of the invention achieves the foregoing objects in a waste water treatment system including means defining a vessel having a closed loop flowpath for the receipt of waste water and at least one wall. Means are provided for introducing waste water to be treated into the vessel along with means for moving waste water along the path. Means are also provided for introducing an oxygen containing medium into the waste water in the vessel to promote oxidation of organic solids in the waste water. A clarifier is mounted on a wall or walls and in the vessel within the flow path. The clarifier is narrow in relation to the flow path and elongated in the direction of the flow path. It includes an upper end and a lower end with the upper and lower ends being adapted to be disposed respectively above and below the level of waste water in the vessel. The clarifier further includes a closed side and closed end walls and an open lower end such that waste water entering the clarifier may enter only through the lower end. A plurality of means are provided along the length of the clarifier for withdrawing treated waste water from the upper end, the withdrawing means being constructed and arranged such that the flow of waste water from the lower end to the upper end will be of sufficiently low velocity that any organic solids initially entering the clarifier will exit the same under the influence of gravity through the lower end.

In a preferred embodiment, the lower end includes a plurality of spaced, generally vertically extending baffles disposed across the flow path. In one embodiment, the lower ends of the baffles are angled in the direction of the flow of the waste water in the flow path and some of the baffles are of relatively short length while others of the baffles are relatively long. In a highly preferred embodiment, the upper end of the clarifier includes an elongated, generally horizontal plate and the withdrawing means comprise a plurality of apertures in the plate along the length thereof.

In another embodiment of the invention, the upper end of the clarifier includes a generally vertical plate adjacent the vessel wall and the withdrawing means comprises a plurality of apertures in the vertical plate spaced along the length thereof.

Preferably, the clarifier is formed of a plurality of generally identical modules and the wall in which the clarifier is mounted is a peripheral wall of the vessel.

Other objects and advantages will become apparent from the following specification taken in connection with the accompanying drawings.

DESCRIPTION OF THE DRAWINGS

FIG. 1 is a plan view of a waste water treatment system made according to the invention;

FIG. 2 is an enlarged, fragmentary plan view of a portion of the system, specifically that including a clarifier;

FIG. 3 is an enlarged, fragmentary vertical section taken approximately along the line 3—3 in FIG. 2;

DESCRIPTION OF THE PREFERRED EMBODIMENT

Figure 4:
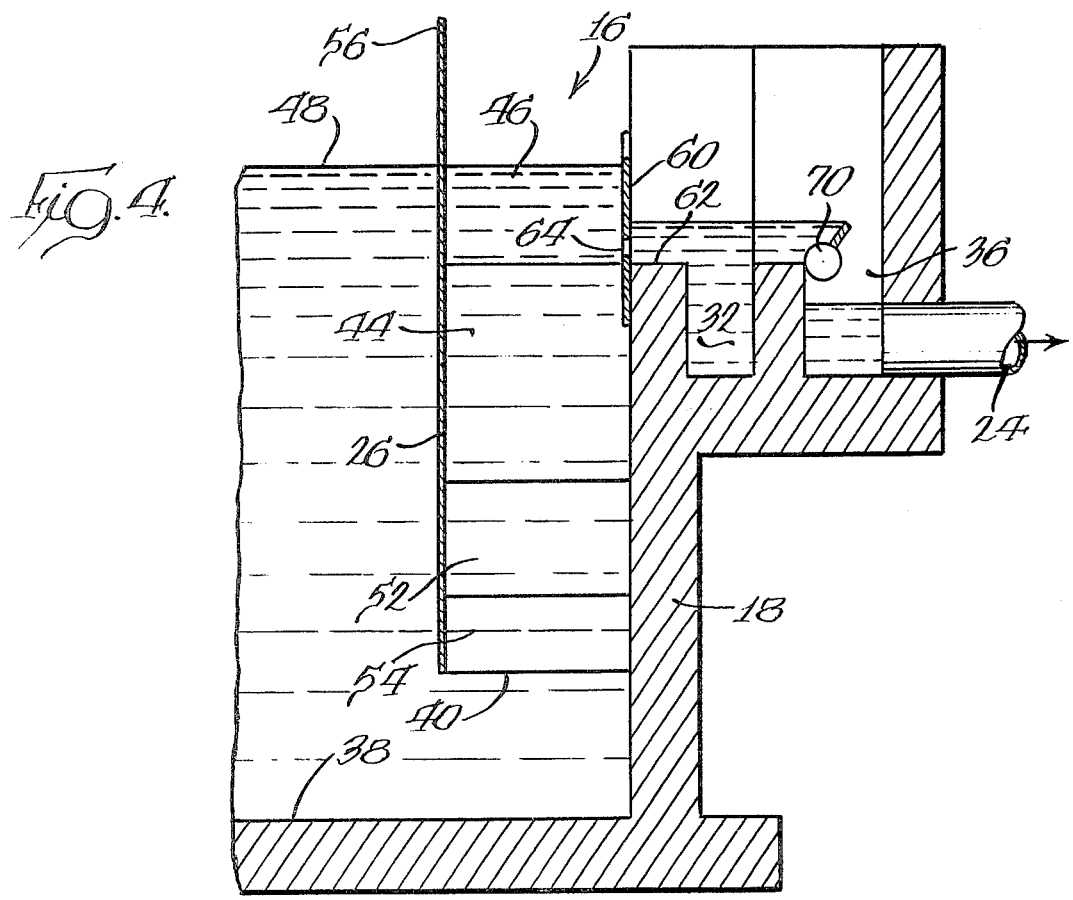
FIG. 4 is an enlarged, fragmentary, vertical section taken approximately along the line 4—4 in FIG. 2.

An exemplary embodiment of a waste water treatment system is illustrated in the drawings and with reference to FIG. 1 is seen to include an oxidation vessel, generally designated 10, in the form of a so-called oxidation ditch. The vessel 10 is in the form of a oval having a central partition or wall 12 which thereby defines an elongated, closed loop flow path for the flow of waste water as schematically illustrated by arrows 14. The sides of the vessel 10 may be earthen or lined as desired but in the area of the clarifier, generally designated 16, it is preferred that the vessel have a generally vertically extending wall 18 formed of concrete or the like.

Aeration rotors 20 of conventional construction extend across the flow path at various locations about the vessel 10 and are rotated in a conventional fashion to provide the bifold function of impelling the waste water along the flow path in the direction of the arrows 14 and for introducing an oxygen containing medium, namely air, into the waste water. As is well known, the rotors 20 will typically be only partially submerged in the waste water within the vessel 10. Alternatively other aeration systems such as diffused air, down pumping, turbines, or the combination of propellers and diffused air may be used.

A waste water inlet for the vessel 10 is schematically illustrated at 22 and an outlet for clarified water is schematically illustrated at 24.

Turning now to the clarifier 16, it will be appreciated from FIG. 1 that the same is considerably elongated in the direction of flow represented by the arrows 14. It will also be appreciated that the same is quite narrow with respect to the width of the flow path which, of course, extends from the wall 18 to the wall 12. The purpose of the latter feature is to avoid any significant decrease in the width of the flow path that would interfere with attaining proper velocity therein. The purpose of the elongation is, of course, to provide adequate clarifying capacity while allowing the clarifier 16 to be quite narrow.

Turning now to FIG. 2, the clarifier 16 is seen to include an imperforate, generally vertically extending sidewall 26 and angular, imperforate, generally vertically disposed end walls 28 and 30. The angular relation of the end walls 28 and 30 with respect to the sidewall 18 of the vessel 10 is chosen so as to avoid accumulations of scum or floating material thereat. Specifically, the velocity of the waste water within the flow path will sweep the angled end walls 28 and 30 clean of scum or floating material.

In one embodiment of the invention, an elongated launder or trough 32 extends the length of the clarifier 16 and is disposed on the outer side of the wall 18. As will be seen, clarified effluent emerging from the upper end of the clarifier 16 will spill into the launder 32 to flow in the direction of arrows 34 to a small collection and control basin 36 to which the effluent outlet 24 is attached.

Referring now to FIGS. 3 and 4, the bottom of the vessel 10 is illustrated at 38 and spaced above the same is an open lower end 40 of the clarifier 16. Waste water within the flow path may enter the open lower end 40 of the clarifier 16 as schematically illustrated by arrows 42 in FIG. 3.

Along the length of the clarifier 16 are a plurality of spaced, generally vertically extending baffles 44. The baffles 44 extend from the lower end 40 of the clarifier upwardly to be in proximity to the upper end 46 of the clarifier and terminate somewhat below the intended water level 48 of waste water within the vessel 10.

Each baffle 44 has an angularly disposed lower end 50, the angle of the same being directed downstream in terms of the direction of flow represented by the arrows 14.

Desirably, a plurality of shorter baffles 52 are disposed between each of the baffles 44. Like the baffles 44, the baffles 52 have lower ends 54 disposed angularly in the downstream direction of flow within the vessel 10.

It will be observed from FIG. 4 that the upper end 56 of the sidewall 26 of the clarifier 16 extends well above the water level 48 and that the baffles 44 and 52 extend from the sidewall 26 to be in substantial abutment with the wall 18 of the vessel 10. Thus, for all intents and purposes, water may enter the clarifier 16 only through the open lower end 40.

In a preferred embodiment, the clarifier is arranged in a plurality of modules of 8 or 10 feet in length. The baffles 44 and 52 are all secured by any suitable means to the sidewall 26 and extend therefrom in a cantilever fashion toward the wall 18 of the vessel 10. Suitable concrete anchors may be employed to secure the baffles 44 to the wall 18. In such a case, of course, the sidewall 26 would be made up of a plurality of plate-like elements having a length corresponding to the desired length of each module.

In the case of the embodiments illustrated in FIGS. 1-4, the upper end 46 of the clarifier 16 is separated from the launder 32 by a vertically disposed plate 60 secured in any suitable fashion to the upper end of the wall 18. The plate 60 may likewise be in sections as illustrated in FIG. 3 as part of the modular design of the assembly.

At locations along the length of the plate 60 and just above the upper edge 62 of the wall 18 between the interior of the vessel 10 and the launder 32 are a series of apertures 64. The apertures 64 are also located below the intended water level 48 in the vessel 10 and as such, constitute the exit path for clarified effluent from the vessel 10 to the launder 32. The number of apertures 64 and their locations are chosen so as to allow the desired flow rate of effluent out of the vessel and to assure that a certain velocity of upward flow of waste water within the clarifier 16 itself is less than the settling rate of organic solids in such waste water while preventing short circuiting of effluent. Thus, any water entering the clarifier in the direction of the arrows 42 as illustrated in FIG. 3 will be moving at a sufficiently slow velocity so as to allow any organic solids that may enter the lower part of the clarifier 16 to settle out to the bottom 38 of the vessel 10 or to be recaught in the flow of waste water indicated by the arrows 14. In this respect, the angled bottoms 50 and 54 of the baffles serve to promote such settling.

As seen in FIG. 4, at the interface between the launder 32 and the collection and control basin 36, there is disposed a rotatable, adjustable weir 70 which ultimately regulates the water level 48 within the vessel 10 and the degree of immersion of the rotor 20 to thereby control the rate of oxidation of organic solids within the system.

If desired, the upper edges of the plates 60 may be provided with a series of V-shaped notches 72 to define a so-called V-notch weir over which waste water may flow when the level in the vessel 10 exceeds the desired value.

Figure 5:
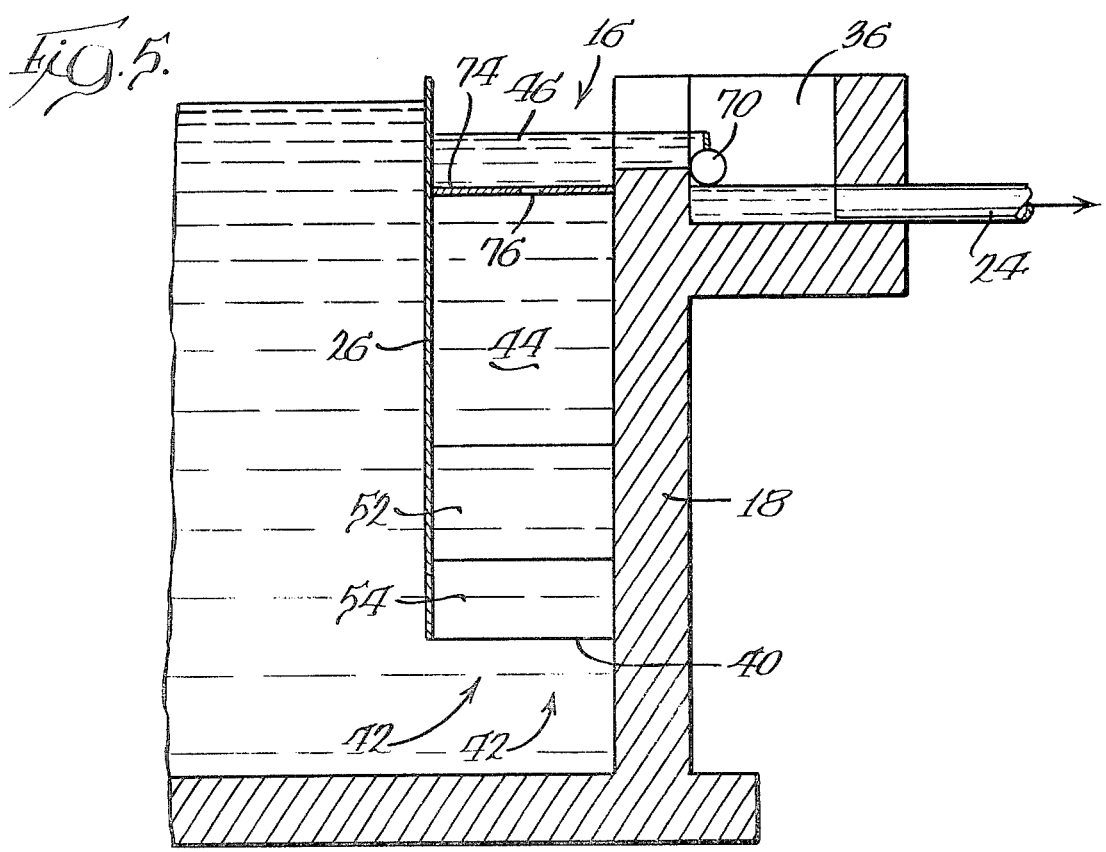
FIG. 5 is a view similar to FIG. 4 but of a modified embodiment of the invention.

FIG. 5 illustrates a modified embodiment of the invention wherein the launder 34 and the expense of constructing the same is disposed with. In the embodiment of FIG. 5, the collection and control basin is located directly on the upper edge of the wall 18 and has a length significantly shorter than the length of the overall clarifier 16 to avoid construction costs. The plate 60 is dispensed with and in lieu thereof, a generally horizontally disposed plate 74 having apertures 76 is disposed between the sidewall 26 of the clarifier and the wall 18. The apertures 76 are spaced in the same fashion as the apertures 64 and perform the same function. Utilizing this arrangement, the upper end 46 of the clarifier serves the function of the launder 34 thereby eliminating the necessity of the latter.

As in the case of the embodiments shown in FIGS. 1-4, the entrance to the collection and control basin 36 is provided with an adjustable weir 70 for the same purpose.

While the invention has been shown and described as having the clarifier mounted on the outer wall of the vessel, it could be mounted on the inner wall 12 as well. Alternatively, a clarifier could be mounted on both walls if needed to provide a desired clarification capacity. Further a wall between the walls 12 and 18 within the flow channel could be employed to support one or more clarifiers.

From the foregoing, it will be appreciated that a waste water system made according to the invention provides substantial advantages over conventional constructions employing separate clarifying and oxidation vessels since but a single vessel need be constructed avoiding the costs of excavation for a second vessel, interconnecting piping, a recirculation lift station for removing organic solids from the clarifier and returning them to the oxidation vessel and other factors. The same functions may be achieved in a smaller space thereby reducing the area required for the system and reducing the head loss through the system. Operational costs are substantially reduced since the cost of operating a recirculating lift station is avoided. Maintenance costs are likewise reduced since the separate clarifier vessel and the necessary recirculation pumps are eliminated.

At the same time, it will be appreciated that a waste water system made according to the invention likewise provides substantial advantages over known intrachannel clarifying systems in that there is no restriction in the flow channel that may act as a baffle or the like which may collect scum and floating material. Thus, the cost of constructing, installing and operating separate means for handling floating material and scum are all avoided. In the same vein, there is no restriction in the channel that would interfere with attainment of the desired velocity or form low velocity areas where undesirable sludge deposition would be likely to occur.

A waste water system made according to the invention does not require a variable depth channel in the oxidation vessel which could increase excavation and construction expenses. The particular clarifying structure used makes complete use of the settling volume of the clarifier and through the unique arrangement of baffles, is not subject to liquid velocities in the horizontal direction or short circuiting between the entrance and exit portions of the clarifier that might result in interference with the settling of solids.

I claim:

1. A waste water treatment system, comprising:
   means defining a vessel having a closed loop flow path for receipt of waste water and at least one wall;
   means for introducing waste water to be treated into said vessel;
   means for moving waste water along said path;
   means for introducing an oxygen containing medium into the waste water in said vessel to promote oxidation of organic solids in said waste water;
   a clarifier mounted on said wall and in said vessel within said flow path, said clarifier being sufficiently narrow in relation to said flow path so as to avoid any significant decrease in the cross sectional area thereof to avoid interference with maintenance of a desired velocity of waste water in said path and elongated in the direction of said flow path and having an upper end and a lower end, said upper and lower ends being disposed respectively above and below the intended level of waste water in said vessel, said clarifier having closed side and end walls and having means defining an open lower end such that waste entering said clarifier may enter only through said lower end; and
   a plurality of means along the length of said clarifier for withdrawing treated waste water from said upper end, said withdrawing means being constructed and arranged such that the flow of waste water from said lower end to said upper end will be of sufficiently low velocity that any organic solids initially entering said clarifier will exit the same under the influence of gravity through said open lower end.

2. The wastewater treatment system of claim 1 wherein the means defining said lower end includes a plurality of spaced generally vertically extending baffles disposed across said flow path.

3. The wastewater treatment system of claim 2 wherein the lower ends of said baffles are angled in the direction of flow of waste water in said flow path, and some of said baffles are relatively short while others of said baffles are relatively long.

4. The waste water treatment system of claim 1 wherein said upper end includes an elongate generally horizontal plate and said plurality of withdrawing means comprises means defining a plurality of apertures in said plate spaced along the length thereof.

5. The waste water treatment system of claim 1 wherein said upper end includes a generally vertical plate adjacent said vessel wall and wherein said plurality of withdrawing means comprises means defining a plurality of apertures in said plate spaced along the length thereof.

6. The waste water treatment system of claim 1 wherein said clarifier is formed of a plurality of generally identical modules.

7. The waste water treatment system of claim 1 wherein said wall on which said clarifier is mounted is a peripheral wall of said vessel.

8. In a waste water treatment system, the combination of
an oxidation vessel for the receipt of waste water and including at least one wall;
means for introducing waste water into said vessel;
means for introducing oxygen into waste water contained within said vessel;
means defining an effluent outlet on said wall at or near an upper edge thereof;
a clarifier mounted on said wall at said outlet, said clarifier being narrow in comparison to said vessel so as to avoid any significant decrease in the cross sectional area of a flow path defined by said vessel, said clarifier including generally vertical end walls and an imperforate, elongated generally vertical side wall and defining upper and lower ends respectively located above and below the intended level of waste water in said vessel, said clarifier lower end providing for the admission of waste water into said clarifier from said vessel along the length of the clarifier; and
an apertured plate extending along the length of said clarifier at said upper end and hydraulically interposed between said clarifier and said outlet with the apertures in said plate located below the intended level of waste water in said vessel.

9. The waste water treatment system of claim 8 wherein said outlet comprises an elongated launder at the upper edge of said vessel wall extending substantially the length of said clarifier and said plate is vertically disposed on said vessel wall between said launder and said clarifier.

10. The waste water treatment system of claim 8 wherein said clarifier is elongated in comparison to said outlet and said plate is generally non-vertically disposed between said vessel wall and said side wall with an edge below the level of said outlet.

11. The waste water treatment system of claim 9 or 10 wherein said vessel includes means defining a closed loop flow path for waste water therein and said clarifier is elongated in the direction of said flow path and narrow with respect thereto, and said oxygen introducing means includes at least one rotor adjacent the top of said vessel for aerating waste water in said vessel and for directing the waste water along said flow path and past said clarifier, said outlet including means for adjusting the level of waste water in said vessel above the apertures in said plate to thereby control the immersion of said rotor(s) and the aeration of the waste water.

* * * * *